United States Patent
Koo

(10) Patent No.: US 8,019,852 B2
(45) Date of Patent: Sep. 13, 2011

(54) MOBILE COMMUNICATION TERMINAL AND METHOD FOR ALIGNING PREFERENCE ITEMS

(75) Inventor: Nam-Suk Koo, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 67 days.

(21) Appl. No.: 10/916,801

(22) Filed: Aug. 12, 2004

(65) Prior Publication Data

US 2005/0066029 A1    Mar. 24, 2005

(30) Foreign Application Priority Data

Sep. 19, 2003 (KR) .................. 10-2003-0065101

(51) Int. Cl.
G06F 15/173 (2006.01)
(52) U.S. Cl. .................................... 709/224
(58) Field of Classification Search .............. 455/466, 455/414.1; 709/224
See application file for complete search history.

(56) References Cited

U.S. PATENT DOCUMENTS

| | | | |
|---|---|---|---|
| 6,285,364 B1 * | 9/2001 | Giordano et al. | 715/804 |
| 6,961,590 B1 * | 11/2005 | Toebes | 455/564 |
| 2001/0006388 A1 | 7/2001 | Kim et al. | |
| 2002/0038342 A1 * | 3/2002 | Ito | 709/203 |
| 2002/0057297 A1 * | 5/2002 | Grimes et al. | 345/810 |
| 2002/0128767 A1 * | 9/2002 | Cardno et al. | 701/202 |
| 2003/0040850 A1 * | 2/2003 | Najmi et al. | 701/1 |
| 2003/0061239 A1 * | 3/2003 | Yoon | 707/104.1 |
| 2004/0043758 A1 * | 3/2004 | Sorvari et al. | 455/414.1 |
| 2004/0073918 A1 * | 4/2004 | Ferman et al. | 725/34 |
| 2004/0235460 A1 * | 11/2004 | Engstrom et al. | 455/414.1 |
| 2005/0193416 A1 * | 9/2005 | Przybylek | 725/53 |
| 2007/0157121 A1 | 7/2007 | Kim et al. | |

FOREIGN PATENT DOCUMENTS

| | | |
|---|---|---|
| KR | 1020010097418 | 11/2001 |
| KR | 1020020057260 | 7/2002 |
| KR | 1020020078419 | 10/2002 |
| KR | 100390364 | 6/2003 |

* cited by examiner

*Primary Examiner* — Patrick N Edouard
*Assistant Examiner* — Shantell Heiber
(74) *Attorney, Agent, or Firm* — The Farrell Law Firm, P.C.

(57) ABSTRACT

A mobile communication terminal and method for aligning preference items. The mobile communication terminal has a memory for storing an access value for each item, which is made based on access times of a user to each item, a weight value of each item determined by the user, and a preference value of each item, which is calculated by considering the access value and the weight value of each item, and a control section for changing the access value of a predetermined item whenever the user selects the predetermined item, calculating the preference value of the predetermined item based on a changed access value and the weight value of the predetermined item, and forming a preference item list by aligning items based on the preference values thereof.

14 Claims, 7 Drawing Sheets

MOBILE COMMUNICATION TERMINAL AND METHOD FOR ALIGNING PREFERENCE ITEMS

PRIORITY

This application claims priority to an application entitled "Mobile Communication Terminal and Method for Aligning Preference Items" filed in the Korean Industrial Property Office on Sep. 19, 2003 and assigned Serial No. 2003-65101, the contents of which are hereby incorporated by reference.

BACKGROUND OF THE INVENTION

1. Field of the Invention

The present invention relates to an apparatus and a method for aligning preference items in a mobile communication terminal.

2. Description of the Related Art

Generally, a mobile communication terminal has various menus in the form of a predetermined tree. The menu tree enables a user to access a sub-menu only through a main menu. Accordingly, when the user of the mobile communication terminal uses a short message service (SMS) or an E-mail service, the user must manually input an SMS transmission number or an E-mail address into the mobile communication terminal, or must select the SMS transmission number or the E-mail address by searching through various SMS transmission numbers or the E-mail addresses, which are registered in a telephone book of the mobile communication terminal.

The user of the mobile communication terminal may want to easily select preference menus, SMS transmission numbers, or E-mail addresses, which are frequently used by the user. However, in the conventional mobile terminals, the user cannot easily access the preference menus, SMS transmission numbers, or E-mail addresses in conventional communication terminals.

SUMMARY OF THE INVENTION

Accordingly, the present invention has been designed to solve the above-mentioned problems occurring in the prior art, and a first object of the present invention is to provide a mobile communication terminal and a method for enabling a user to easily access required menus according to a user preference for the menus.

A second object of the present invention is to provide a mobile communication terminal and a method enabling a user to easily access required SMS transmission numbers or E-mail addresses according to a user preference for the SMS transmission numbers or E-mail addresses.

To accomplish the above and other objects, the present invention provides a mobile communication terminal comprising: a memory for storing an access value for each item, which is determined based on access times of a user to each item, a weight value of each item determined by the user, and a preference value of each item calculated by considering the access value and the weight value of each item; and a control section for changing the access value of a predetermined item whenever the user selects the predetermined item, calculating the preference value of the predetermined item based on a changed access value and the weight value of the predetermined item, and forming a preference item list by aligning items based on the preference values thereof.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
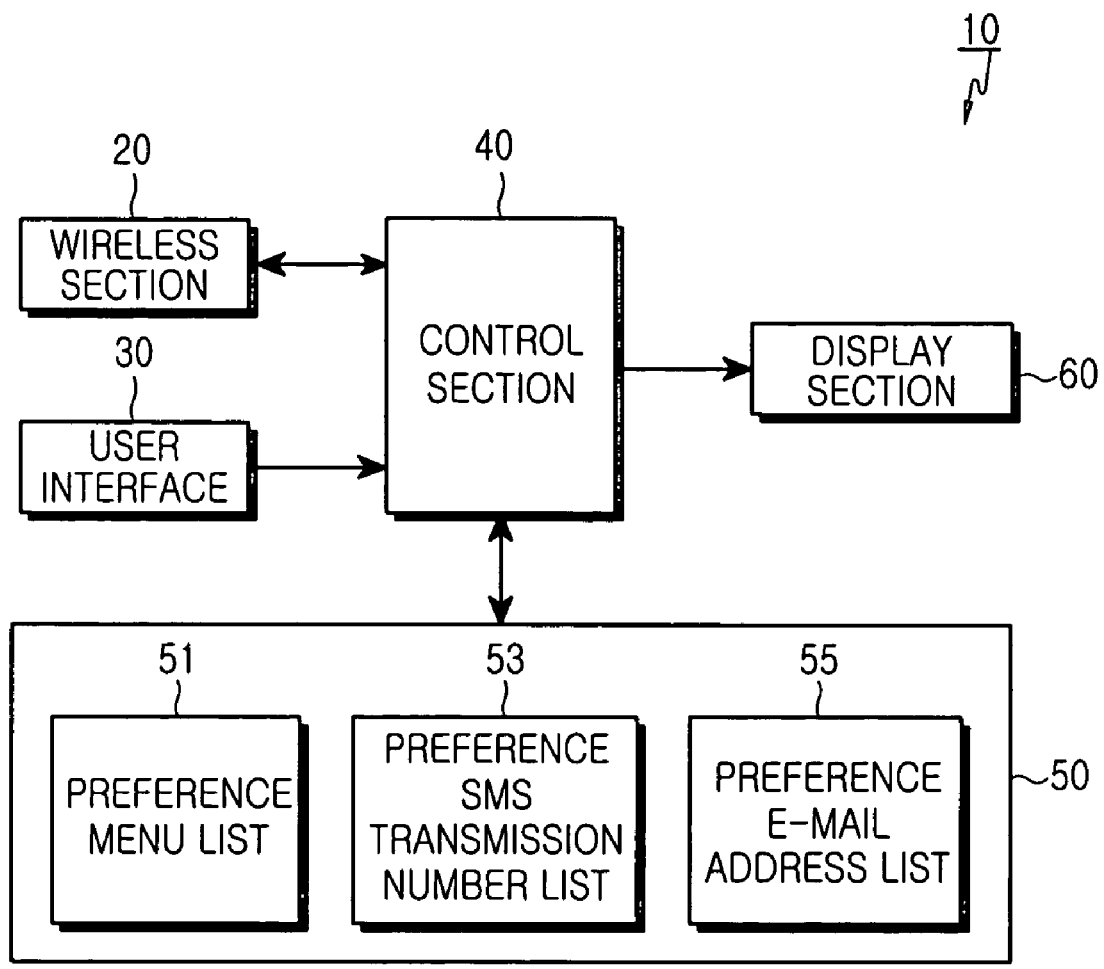
FIG. 1 is a block view illustrating a structure of a mobile communication terminal according to an embodiment of the present invention.

Preferred embodiments of the present invention will be described in detail herein below with reference to the accompanying drawings. In the following description of the present invention, the same reference numerals are used to designate the same or similar components and a detailed description of known functions and configurations incorporated herein will be omitted when it may make the subject matter of the present invention rather unclear.

FIG. 1 is a block view illustrating a structure of a mobile communication terminal 10 according to an embodiment of the present invention. Referring to FIG. 1, the mobile communication terminal 10 includes a wireless section 20, a user interface 30, a control section 40, a memory section 50, and a display section 60. The control section 40 controls an operation of the mobile communication terminal 10. In addition, the control section 40 of the present invention tracks access times of a user with respect to predetermined menus. Further, the control section 40 tracks access times of the user with respect to SMS transmission numbers and E-mail addresses. The control section 40 calculates preference values for such items based on the access times and weight values for such items determined by the user. In addition, the control section 40 sequentially aligns such items according to the preference values and stores aligned items in a list.

If the user requests a preference item list, the control section 40 displays the preference item list in the display section 60. For example, even if the user accesses menus A and B three and five times, respectively, a preference value of the menu A may be larger than a preference value of the menu B because the preference values of the menus are also determined according to the weight values of the menus, which have been predetermined by the user. That is, when the user selects one of items, the control section 40 changes an access value (access times) for the selected item and calculates the preference value of the selected item based on the changed access value and the weight value for the item. The control section 40 aligns the items according to the preference values thereof, thereby forming the preference item list.

The memory 50 stores data that is required for controlling an operation of the mobile communication terminal 10, or created during the operation of the mobile communication terminal 10. According to the present invention, the memory 50 includes a preference menu list 51, a preference SMS transmission number list 53, and a preference E-mail address list 55. The preference menu list 51 includes menus aligned in the order of preference values thereof, calculated based on the access value and weight values determined by the user.

In the similar manner with the preference menu list 51, the preference SMS transmission number list 53 and the preference E-mail address list 55 include SMS transmission numbers and E-mail addresses, which are aligned in the order of preference values thereof calculated based on the access values and weight values determined by the user. That is, the memory 50 stores the access value for each item, the weight value of each item determined by the user, and the preference value of each item calculated according to the access value and the weight value of the items.

The wireless section 40 controls the sending/receiving of voice data, character data, and control data under the control of the control section 40. The user interface 30 includes a plurality of numerical keys and functional keys. The user interface 30 sends input data corresponding to keys selected by the user to the control section 40. Such user interface 30 may include a key matrix or a touch screen.

When the user interface 30 is a touch screen, the numeral keys, functional keys, and directional keys provided in the touch screen can be manipulated by using an input tool, such as a stylus pen.

The display section 60 displays various messages under the control of the control section 40. The display section 60 may include a liquid display device (LCD), a thin film transistor (TFT), or an organic electroluminescence (EL).

Figure 2:
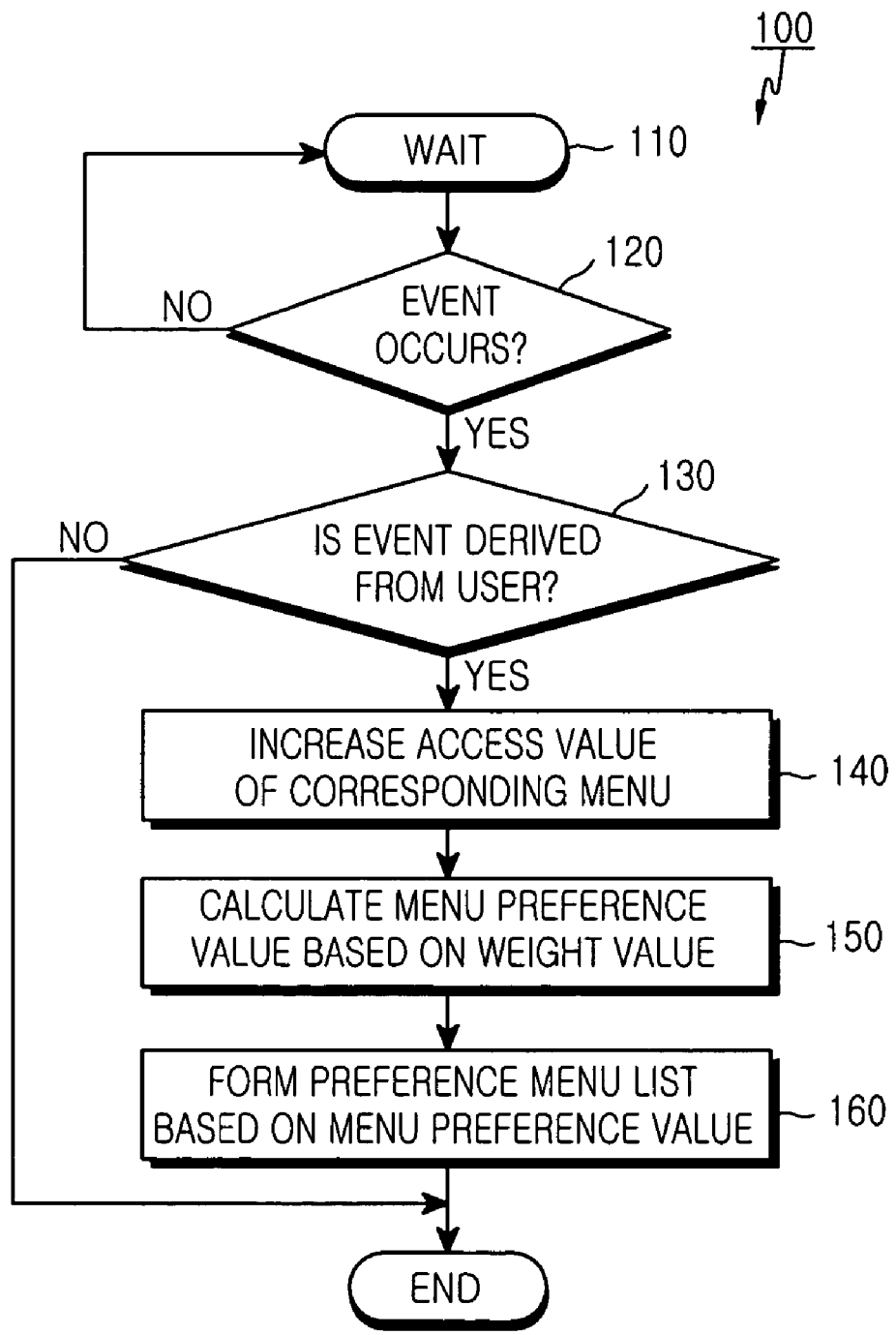
FIG. 2 is a flowchart illustrating a method for providing a preference menu list in a mobile communication terminal according to an embodiment of the present invention.
Figure 3:
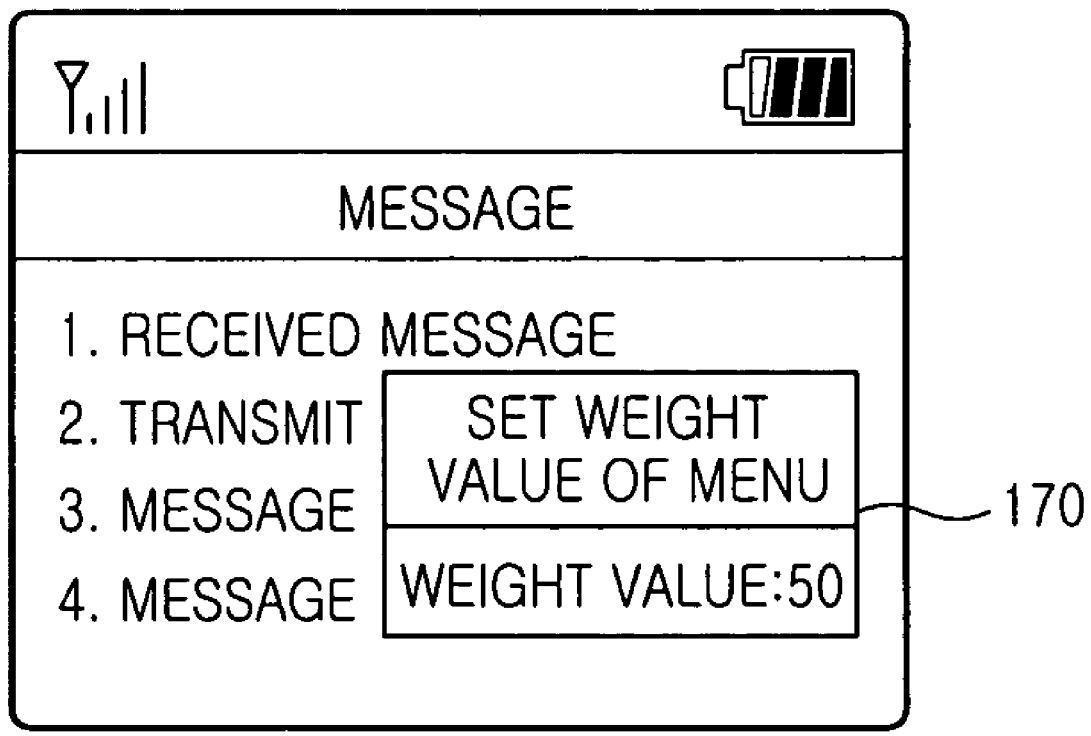
FIG. 3 is a view illustrating a screen image for determining a weight value for a menu according to an embodiment of the present invention.
Figure 4A:
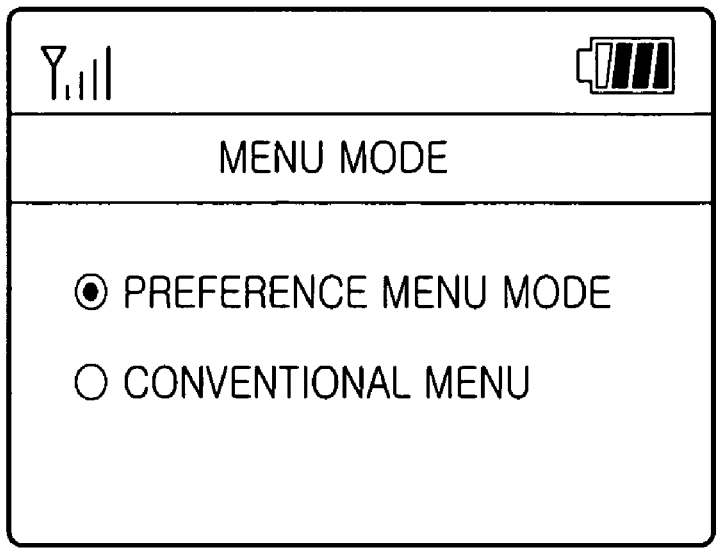
FIGS. 4A and 4B are views illustrating screen images representing a menu mode and a preference menu, respectively.
Figure 4B:
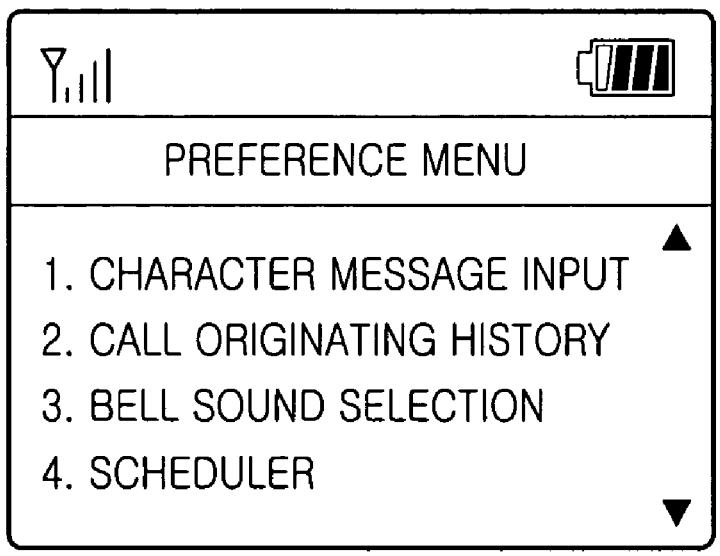

FIG. 2 is a flowchart illustrating a method for providing a preference menu list in a mobile communication terminal according to an embodiment of the present invention, FIG. 3 is a view illustrating a screen image for determining a weight value for a menu according to an embodiment of the present invention, and FIGS. 4A and 4B are views illustrating screen images representing a menu mode and a preference menu, respectively.

Referring to FIGS. 1 and 2, the control section 40 of the mobile communication terminal is maintained in a standby state in step 110. Then, the control section 40 checks whether an event occurs in step 120. When the event occurs, the control section 40 of the mobile communication terminal checks whether the event is derived from a user's selection for a menu function in step 130. Besides the event caused by the user's selection for the menu function, other events may occur in the mobile communication terminal due to incoming calls or an operation of a timer.

Because the present invention is directed to creating a list of preference menus, the present embodiment creates the preference menu list when an event occurs, assuming that the event is derived from the user's selection for the menu function. That is, when the event is derived from the user's selection for the menu function, the control section 40 increases an access value for the corresponding menu in step 140). The access value is assigned with respect to all sub-menus to be selected by the user for realizing various functions of the mobile communication terminal. In addition, the access value for each menu is increased whenever the user selects the corresponding menu.

The control section 40 calculates a preference value of the selected menu by considering a weight value of the selected menu in step 150. The user may assign a weight value with respect to all sub-menus to be selected by the user for realizing various functions of the mobile communication terminal. That is, the user determines the weight value of each menu.

Once the preference value is calculated in step 150, control section 40 forms a preference menu list based on the preference values in step 160.

FIG. 3 is a view illustrating a screen image for determining the weight value for a predetermined menu according to an embodiment of the present invention. As indicated above, the user can determine the weight value for a predetermined menu in a state in which each menu item is displayed in the screen. Referring to FIG. 3, the weight value of the menu is input by the user. For example, if the weight value of the menu is in a range of 1 to 100, the user may input a number within the range of 1 to 100 through a keypad in order to set the weight value of the menu. Alternatively, it is possible to classify the weight value of the menu into three levels, that is, high, middle and low levels. In this case, the user can select a required level from the three levels. Such weight value of the menu may reflect the user's preference when making the preference menu list. However, it is not necessary required for the user to set the weight value of the menu. That is, the user may not set the weight values for the menus. In this case, the weight values of the menus are set to the middle level, or the preference values of the menus are calculated regardless of the weight values of the menus.

FIG. 4B is a view illustrating a screen image of the preference menu list. If the user of the mobile communication terminal selects a menu from the preference menu list, the menu is executed. Each menu included in the preference menu list can be linked to a menu position of a menu tree.

In addition, the user can use a conventional menu system provided in the mobile communication terminal. If the user wants to use the preference menu prepared by the user other than the conventional menu system, the user replaces a conventional menu mode to a preference menu mode through an option of the mobile communication system. In this state, if the user pushes or touches a menu button, the preference menu list can be displayed.

FIG. 4A is a view illustrating the menu mode. The user can set a basic menu mode between the preference menu mode and the convention menu mode from the screen image illustrated in FIG. 4A. The control section 40 can set the preference menu list as a basic menu if the user selects the preference menu mode from the menu mode. Preferably, because the mobile communication terminal has the conventional menu system and the preference menu system, the user may selectively access to the conventional menu system or the preference menu system by using a hot key as required by the user.

Figure 5:
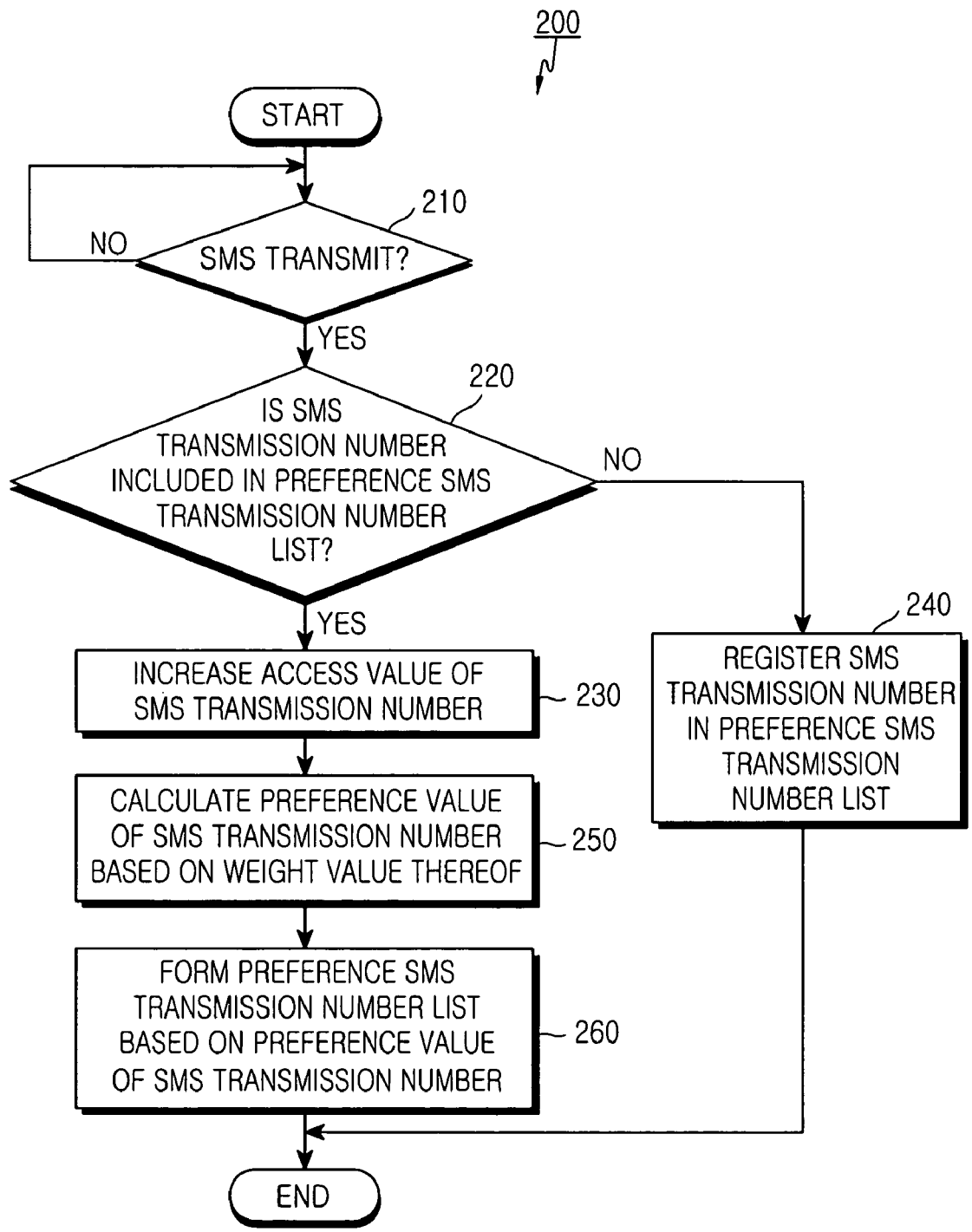
FIG. 5 is a flowchart illustrating a method for providing a preference SMS transmission number list in a mobile communication terminal according to an embodiment of the present invention.

FIG. 5 is a flowchart illustrating a method for providing a preference SMS transmission number list in a mobile communication terminal according to an embodiment of the present invention. Referring to FIGS. 1 and 5, the control section 40 of the mobile communication terminal determines whether an SMS has been transmitted in step 210. If the SMS has been transmitted by the user, the control section 40 determines whether a transmission number of the SMS is included in the preference SMS transmission number list in step 220. If the SMS is not included in the preference SMS transmission number list, the control section 40 registers the SMS transmission number in step 240. If the SMS is included in the preference SMS transmission number list, the control section 40 increases the access value of the corresponding SMS transmission number in step 230. The access value of the SMS transmission number is increased when the user sends the SMS to the corresponding SMS transmission number.

The control section 40 calculates the preference value of the SMS transmission number by considering the weight value of the corresponding SMS transmission number in step 250. Whether the corresponding SMS transmission number must be included in the preference SMS transmission number list is determined based on the weight value of the corresponding SMS transmission number. If the corresponding SMS transmission number is included in the preference SMS transmission number list, the weight value of the SMS transmission number reflects the user's preference for the SMS transmission number. The weight value of the SMS transmission number is directly set by the user with respect to each SMS transmission number registered in a telephone book in the mobile communication terminal. That is, the preference value of the SMS transmission number is calculated by considering the access value and the weight value of the SMS transmission number. Then, the control section 40 makes the preference SMS transmission number list according to the preference values of the SMS transmission numbers in step 260.

Figure 6:
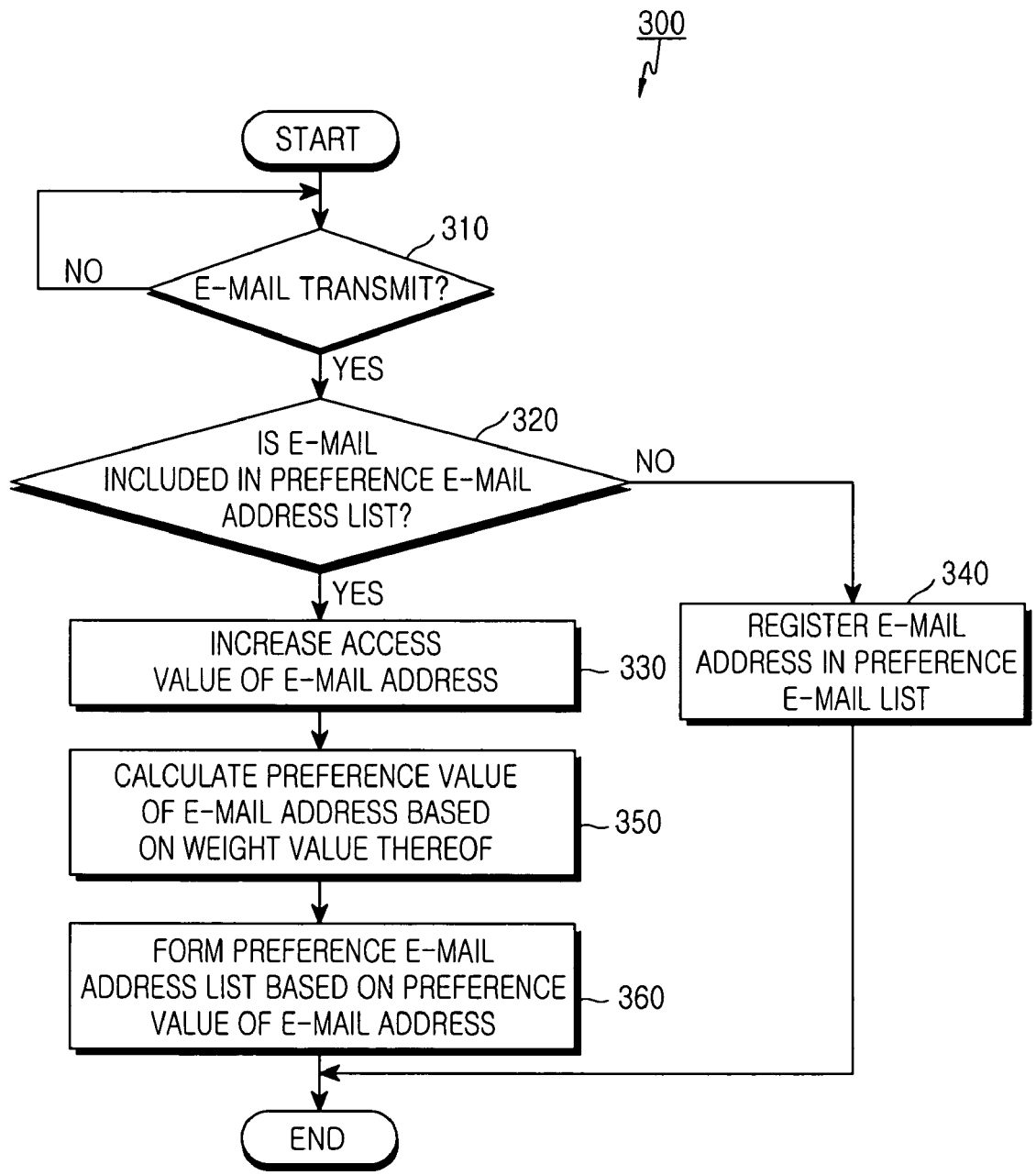
FIG. 6 is a flowchart illustrating a method for providing a preference E-mail address list in a mobile communication terminal according to an embodiment of the present invention.

FIG. 6 is a flowchart for providing a preference E-mail address list in a mobile communication terminal according to an embodiment of the present invention. Referring to FIGS. 1 and 6, the control section 40 of the mobile communication terminal determines whether an E-mail has been transmitted in step 310. If the E-mail has been transmitted by the user, the control section 40 determines whether an E-mail address for the E-mail is included in the preference E-mail address list in step 320. If the E-mail address is not included in the preference E-mail address list, the control section 40 registers the E-mail address in step 340. If the E-mail address is included in the preference E-mail address list, the control section 40 increases the access value of the corresponding E-mail address in step 330. The access value of the E-mail address is increased when the user sends the E-mail to the corresponding E-mail address.

The control section 40 calculates the preference value of the E-mail address according to the weight value of the corresponding E-mail address in step 350. Whether the corresponding E-mail address must be included in the preference E-mail address list is determined based on the weight value of the corresponding E-mail address. If the corresponding E-mail address is included in the preference E-mail address list, the weight value of the E-mail address reflects the user's preference for the E-mail address. The weight value of the E-mail address is directly set by the user with respect to each E-mail address registered in a telephone book in the mobile communication terminal. That is, the preference value of the E-mail address is calculated based on the access value and the weight value of the E-mail address. Then, the control section 40 makes the preference E-mail address list according to the preference values of the E-mail addresses in step 360.

Figure 7:
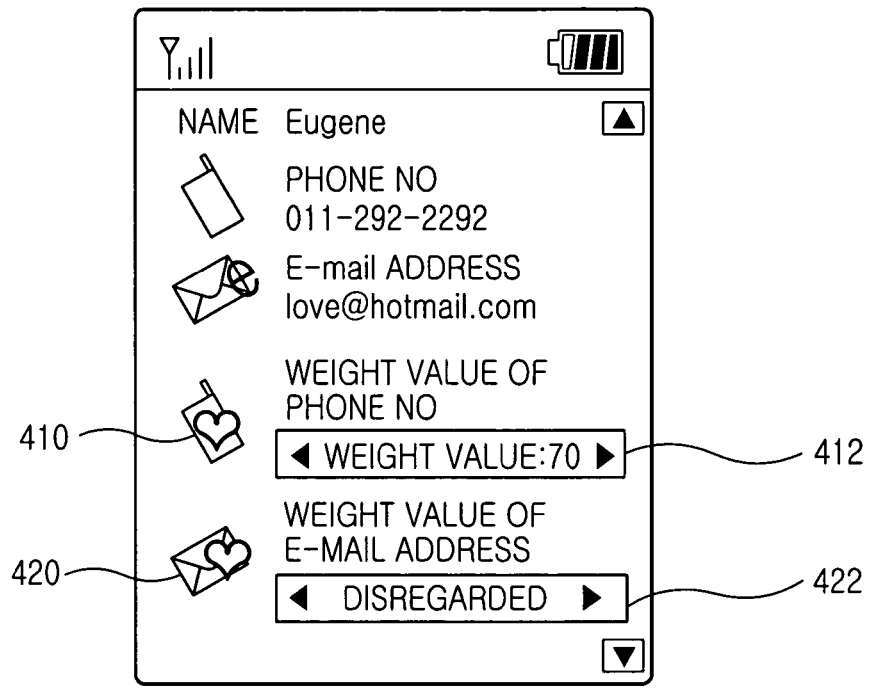
FIG. 7 is a view illustrating a screen image for setting a weight value for each SMS transmission number and E-mail address in a telephone book of a mobile communication terminal according to an embodiment of the present invention.

FIG. 7 is a view illustrating a screen image for setting a weight value of each SMS transmission number and E-mail address in a telephone book of a mobile communication terminal according to an embodiment of the present invention. As illustrated in FIG. 7, the user can set the weight values for SMS transmission numbers and E-mail addresses registered in the telephone book of the mobile communication terminal. Reference numeral 410 represents the weight value of a telephone number of the mobile communication terminal, that is, the weight value of the SMS transmission number. Reference numeral 412 is a window for inputting the weight value of the SMS transmission numbers.

Referring to FIG. 7, the user has input the weight value "70" for the corresponding SMS transmission number. In addition, reference numeral 420 represents the weight value for the E-mail address, and reference numeral 412 is a window for inputting the weight value of the E-mail addresses. The weight value of the corresponding E-mail address is disregarded. The user can select one of various weight values by using a predetermined key, such as a direction key, in the windows for setting the weight values of the telephone numbers and E-mail addresses.

By disregarding the SMS transmission number or the E-mail address represents that the corresponding SMS transmission number or the E-mail address is not included in a preference SMS transmission number list 53 or in a preference E-mail address list 55.

Different from the menu, a large number of the SMS transmission numbers or the E-mail addresses may be registered in the mobile communication terminal. Accordingly, if the user checks a priority for the SMS transmission numbers or the E-mail addresses registered in the telephone book of the mobile communication terminal when sending the SMS transmission numbers or the E-mail addresses, an overhead may occur. Therefore, according to the present invention, the SMS transmission numbers or the E-mail addresses are selected by the user for checking the priority thereof. That is, the user can select the SMS transmission numbers or the E-mail addresses for checking the priority thereof. In addition, a predetermined area of the telephone book may be allotted for checking the priority.

Figure 8:
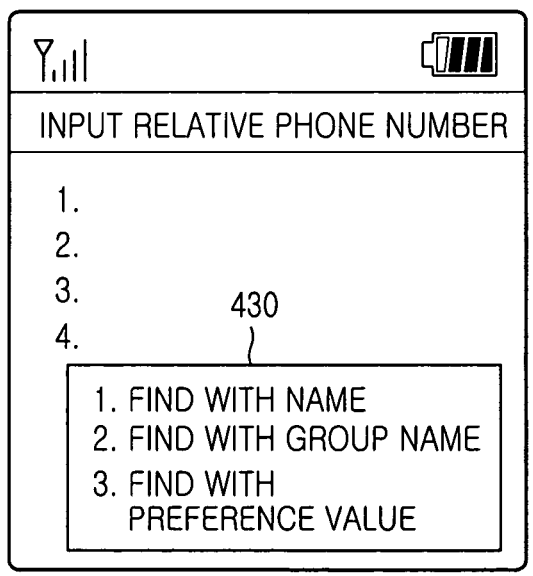
FIG. 8 is a view illustrating a screen image when an SMS is transmitted according to an embodiment of the present invention.

FIG. 8 is a view illustrating a screen image when an SMS is transmitted according to an embodiment of the present invention. Generally, a mobile communication terminal has a function for enabling a user to select a required telephone number by searching a telephone book in the mobile communication terminal, when sending the SMS. According to the present invention, when searching the telephone book, the user can select an SMS transmission number from an SMS transmission number list formed based on preference values of the SMS transmission numbers. Referring to FIG. 8, the user may view the preference SMS transmission number list by selecting "find with preference value" from lists included in a selecting window 430. As a result, the user can select the required telephone number from the preference SMS transmission number list. This mechanism is also identically applied to the E-mail addresses.

As described above, according to the present invention, a menu image adapted for a user' preference is provided in the mobile communication terminal, instead of a conventional menu selecting image, which is uniformly provided in conventional mobile communication terminals. Accordingly, the user is not required to pass through various steps in order to access a required menu. In addition, according to the present invention, the preference SMS transmission number list and the E-mail address list are created by the user Therefore, the user is not required to search and select the required SMS transmission number or the required E-mail address from various SMS transmission numbers or the E-mail addresses.

Although the above description has been illustrated and described with reference to certain menus, telephone numbers, and E-mail addresses, the present invention can be applied to various items, in which the weight values and access values are considered. Therefore, it will be understood by those skilled in the art that various changes in form and details may be made therein without departing from the spirit and scope of the invention as defined by the appended claims.

What is claimed is:

1. A mobile communication terminal comprising:
   a memory for storing an access value, a weight value, and a preference value, with respect to each of a plurality of items; and
   a control section for changing the access value of at least one of the plurality of items when a user selects the at least one item, calculating the preference value of the at least one item based on the changed access value and the weight value of the at least one item, and forming a preference item list by aligning the at least one item in the plurality of items based on the preference values thereof;
   wherein the weight value of the at least one item, representing a preference of the user, is input by the user in a state in which the at least one item is displayed on a screen of the mobile communication terminal and stored in the memory before calculation of the preference value; and
   wherein a plurality of items aligned based on the preference item list are displayed when the user selects a preference mode, and a plurality of items aligned based on a conventional system, automatically provided in the mobile communication terminal without the user's intervention, are displayed when the user selects a conventional mode.

2. The mobile communication terminal as claimed in claim 1, wherein the access value of the at least one item is determined according to at least one access time of the user with respect to the at least one item.

3. The mobile communication terminal as claimed in claim 1, wherein the at least one item includes executive menu functions.

4. The mobile communication terminal as claimed in claim 1, wherein the preference item list includes a preference menu list, and the control section sets the preference menu list as a menu of the mobile communication terminal when the user replaces a conventional menu mode with a preference menu mode.

5. The mobile communication terminal as claimed in claim 1, wherein the at least one item includes selectable telephone numbers.

6. The mobile communication terminal as claimed in claim 1, wherein the at least one item includes selectable E-mail addresses.

7. The mobile communication terminal as claimed in claim 1, wherein the at least one item is excluded from the preference item list according to a determination of the user.

8. A method for aligning preference items in a mobile communication terminal, the method comprising the steps of:
   i) calculating an access value for at least one of a plurality of items;
   ii) calculating a preference value of the at least one item based on the access value and a weight value of the at least one item set by a user; and
   iii) forming a preference item list by aligning the at least one item in the plurality of items according to the preference values of the plurality of items;
   wherein the weight value of the at least one item, representing a preference of the user, is input by the user in a state in which the at least one item is displayed on a screen of the mobile communication terminal and stored in a memory of the mobile communication terminal before calculation of the preference value; and
   wherein a plurality of items aligned based on the preference item list are displayed when the user selects a preference mode, and a plurality of items aligned based on a conventional system, automatically provided in the mobile communication terminal without the user's intervention, are displayed when the user selects a conventional mode.

9. The method as claimed in claim 8, further comprising a step of changing the access value of the at least one item, recalculating the preference value of the at least one item based on the changed access value and the weight value of the at least one item, and re-aligning the at least one item according to the recalculated preference value of the at least one item, when the user accesses to the at least one item.

10. The method as claimed in claim 8, wherein the access value of the at least one item is determined according to access times of the user with respect to the at least one item.

11. The method as claimed in claim 8, wherein the at least one item includes executive menu functions.

12. The method as claimed in claim 8, wherein the preference item list includes a preference menu list, and the preference menu list is set as a menu of the mobile communication terminal when the user replaces a conventional menu mode with a preference menu mode.

13. The method as claimed in claim 8, wherein the at least one item includes selectable telephone numbers.

14. The method as claimed in claim 8, wherein the at least one item includes selectable E-mail addresses.

* * * * *